Patented Nov. 24, 1931

1,833,716

UNITED STATES PATENT OFFICE

ALBERT JAN KLUYVER, OF DELFT, NETHERLANDS, AND FRANCISCUS VISSER'T HOOFT, OF BUFFALO, NEW YORK; SAID KLUYVER ASSIGNOR TO SAID HOOFT

PROCESS FOR THE PREPARATION OF ORGANIC COMPOUNDS BY MEANS OF BACTERIAL OXIDATION

No Drawing. Application filed December 26, 1930, Serial No. 504,992, and in the Netherlands April 25, 1929.

It is known that several organic compounds can be successfully prepared from other compounds by making use of the incomplete oxidative power that several species of bacteria demonstrate under certain conditions. For instance, it is known that under certain conditions glycerine can be converted into dihydroxyacetone with very good yields. In similar ways mannitol can be converted into fructose, glucose into gluconic acid and oxygluconic acid, etc.

Up to the present it has been the practice to dissolve the materials in a concentration of 2% to 5% in a liquid (for example water), which contains the necessary organic and mineral nutritive compounds (malt extract or yeast extract can be used for this purpose). This solution is then more or less completely sterilized and then inoculated with the selected bacteria. As suitable oxidizing bacteria, the bacterium xylinum, acetobacter, suboxydans, bacterium dioxyacetonicum, can be employed. Several other bacteria can be used with equally good results. The bacteria are cultivated at the necessary temperatures which as a rule lie between 20° C. and 40° C. Ordinary room temperature can be used in many cases. It is then necessary to wait till the bacteria have developed sufficiently and the conversion of the oxidation medium has been practically completed. This always takes considerable time. Bertrand, for instance, indicates that in most cases this takes two to three weeks. In later publications shorter periods have been mentioned but when working on a commercial scale it is still necessary to allow growth and activity of the bacteria for a period of several days, a minimum of about 5 days, before the liquid can be worked up for the further separation of the oxidation product.

This long period of bacterial oxidation not only causes a loss in time and therefore increases the investment in equipment, but also this longer time increases chances for infections.

Our invention materially reduces the time necessary for the bacterial oxidations.

Our process makes use of the known fact that the speed of oxidation can be increased by the use of artificial aeration of the liquids inoculated with the bacteria. However, a strong air current under conditions heretofore used would strongly inhibit the growth of the bacteria. Therefore, this special aeration can only be used after a sufficient number of bacteria have come to full development. This always means a considerable loss of time.

Our invention is based on the observation that it is possible to separate the bacteria in a simple way from the liquid after they have been once cultivated, and then use this large mass of bacteria immediately for the conversion of new quantities of oxidation medium with great speed with the help of strong aeration which can be applied immediately.

To obtain these results we can use two methods. It is possible to separate the bacteria in a special supercentrifuge under aseptic conditions from the liquid and add such separated bacteria to a freshly prepared sterilized liquid which has been cooled to the right temperature. We also found it possible to retain the once cultivated mass of bacteria substantially in the original reaction vat. This was done by adding at the beginning of the process a sufficient quantity of materials which absorb bacteria. For this purpose several types of coal, kieselguhr, silica gel and similar substances can be used. Such materials are hereinafter referred to as bacteria absorbent carriers. These materials sink to the bottom of the reaction vat shortly after the reaction has been completed and the artificial aeration has been stopped. By absorption and through mechanical means they take with them the majority of the bacteria. The supernatant clear liquid is then decanted by suitable means and a new batch of the sterilized liquid containing new oxidation medium is let into the same reaction vat. Immediately after this a strong aeration is started and under these circumstances (that is, many bacteria and high oxygen content) the oxidation takes place with great speed. Glycerine, for example, in 2 to 5% solution can be converted in this way into dihydroxyacetone in 24 hours. The same procedure is then repeated and we have found that in this way with the same mass of bacteria and absorbent carriers, 20 or more batches can be run successfully with great speed.

How important and unexpected this result is will be understood after reading a recent Austrian patent application (A–2333/27 Kl. 6c of April 13th, 1927), which claims as an advantage of their process that a similar conversion can be obtained in 4 to 5 days.

For the purpose of more completely explaining the nature of this invention, the following example is given but the invention is not restricted to the specific example since not only the substances and bacteria here referred to can be employed but also other substances and other bacteria having a like effect.

2000 liters of a 2% glycerine solution in malt germ extract, to which 20 kilograms of completely sterilized infusorial earth has been added, is sterilized, cooled to 30° C. and then inoculated with a separately prepared culture of acetobacter suboxidans in 100 liters of malt extract. A slow aeration is immediately started. Total quantity of air per hour about 10 cubic meters. After 36 hours the bacteria have sufficiently developed to allow a strong aeration (that is such amount of aeration as would have been, in the initial stage, growth inhibiting). About 240 cubic meters of air are blown through per hour. Approximately 24 hours later about 95% of the glycerine is found to have been converted into dihydroxyacetone. The infusorial earth is now allowed to settle down, and carries down the greater part of the bacteria. The supernatant clear liquid is taken off. A new quantity of 2000 liters of sterilized and cooled 2% glycerine solution is added. Now the strong aeration can be started immediately with the result that 92 to 97% of this last added glycerine is converted in 20 to 24 hours into dihydroxyacetone. The aeration is then stopped again. The infusorial earth is again allowed to settle and all further manipulations are repeated after every period of about 20 to 24 hours. In this way it is possible to obtain a batch of 2% solution of dihydroxyacetone every 24 hours. This solution is then further treated by known methods to obtain the pure dihydroxyacetone.

We claim:

1. In the bacteriological oxidation of organic compounds the herein described improvement which comprises adding a large amount of the oxidation-producing bacteria to a bulk of liquor containing an organic substance capable of being oxidized by action of such bacteria, strongly aerating such liquor until about the optimum degree of oxidation of said organic substance has been effected, such strong aeration involving the application of much more than 10 cubic meters of air per hour per 2100 liters of liquid, separating the bacteria from the liquor and mixing substantially all of the bacteria with a new bulk of said liquor about equal to the bulk used in said first step and repeating the cycle of operations.

2. In the oxidation of organic compounds, the herein described process which comprises adding a large amount of oxidation-producing bacteria and adding a bacteria absorbing carrier to the liquor containing an organic substance to be oxidized, strongly aerating such liquor until about the optimum degree of oxidation of the said organic substance has been effected, such strong aeration involving the application of much more than 10 cubic meters of air per hour per 2100 liters of liquid, allowing settlement of the said carrier and bacteria carried thereby, separating said carrier and bacteria carried thereby and mixing substantially the entire amount of the same with a similar fresh batch of the said liquor, and repeating the cycle of operations.

3. In the process of claim 1, centrifugally separating the bacteria from the liquor at the end of the bacterial treatment thereof.

4. A process for the preparation of organic compounds which comprises bringing together a bulk of liquid to be subjected to bacteriological oxidation, a mass of fully developed oxidation-producing bacteria which are resistant to a strong aeration involving the passage of much more than 10 cubic meters of air per hour through 2100 liters of such liquid, and subjecting such mixture to such strong aeration.

5. A process as claimed in claim 4 which comprises the step of separating bacteria under sterile conditions by a high degree of centrifugal force, and subsequently adding substantially all of such separated bacteria to fresh liquids and repeating said steps several times.

6. A process as claimed in claim 4 which comprises the step of adding to the liquid in which the bacteria are cultivated in pure culture, absorbing materials which can absorb bacteria, and then retaining the bacteria by settling and decantation of the liquid, thereafter adding thereto, a batch of liquid containing a constituent to be oxidized, aerating the mixture until oxidation is sufficiently accomplished and thereafter repeating this cycle of operations.

7. A process which comprises first cultivating a culture of oxidation-inducing bacteria, in a bulk of sterile liquor containing an organic substance capable of being oxidized by such bacteria, and containing nutrient material for such bacteria, by inoculating such liquor with such bacteria, then slowly aerating the liquor at a rate not inimical to the growth and multiplication of such bacteria, until the said bacteria have greatly multiplied in such liquor, then increasing the amount of aeration to an extent which would be harmful in the initial stage of the process, until the oxidation of the said oxidizable substance is completed to about the optimum degree, separating the bacteria from the liquor and mixing such bacteria with a new bulk of such sterile liquor and at once strongly aerating the same until the oxidation has been completed to about the optimum degree, and repeating these last two steps with successive new batches of said liquor.

8. In the process of claim 7 the steps of adding a bacteria-absorbing carrier to the initial liquor during the initial stage of the process, and subsequently separating the bacteria from the liquor by allowing settlement of the said carrier with the bacteria held thereby, and re-adding the bacteria while associated with said carrier, to a liquor containing substances to be oxidized.

9. In the process of claim 7, the step of effecting the separation of the bacteria from the liquor by centrifugal treatment thereof, under aseptic conditions.

10. In a bacteriological oxidation of glycerine to dihydroxyacetone, the herein described process which includes forming a sterile dilute aqueous solution of glycerine containing nutrient material for bacteria, inoculating same with a culture of oxidation-producing bacteria, and subjecting same to a slow aeration involving the passage of air at a rate not substantially above 10 c. m. of air per 2100 liters of the liquid mass per hour until the bacteria have become capable of withstanding a much stronger aeration, and thereafter increasing the amount of aeration until a large fraction of the glycerine has been oxidized.

11. In the bacteriological oxidation of glycerine to dihydroxyacetone, the herein described process which includes forming a sterile dilute aqueous solution of glycerine containing nutrient material for bacteria, inoculating same with a culture of oxidation-producing bacteria, and subjecting same to a slow aeration involving the passage of air at a rate not substantially above 10 c. m. of air per 2100 liters of the liquid mass per hour until the bacteria have become capable of withstanding a much stronger aeration, and thereafter increasing the amount of aeration until a large fraction of the glycerine has been oxidized, separating the main bulk of the bacteria from the main bulk of the liquid, bringing another similar bulk of the sterile aqueous solution of glycerine and said bulk of bacteria into contact with each other and subjecting such mixture to such strong aeration until a large fraction of the glycerine has been oxidized.

12. In the bacteriological oxidation of glycerine, a herein described process which comprises bringing together a sterile dilute solution of glycerine with a large amount of fully developed oxidation-inducing bacteria capable of withstanding a strong aeration involving the treatment of each 2100 liters of such mixture with much more than 10 cubic meters of air per hour, and then subjecting such mixture to such strong aeration.

13. In the bacteriological oxidation of glycerine, the herein described process which comprises bringing together a sterile dilute solution of glycerine with a large amount of fully developed oxidation-inducing bacteria capable of withstanding a strong aeration involving the treatment of each 2100 liters of such mixture with much more than 10 cubic meters of air per hour, and then subjecting such mixture to such strong aeration and thereafter separating the liquid from the bacteria without destroying the latter.

14. In the bacteriological oxidation of an organic substance, the step of inoculating a solution of the organic substance with an amount of bacteria capable of inducing oxidation of said organic substance, to produce a mixture in which said bacteria can grow and develop during only a slow aeration, subjecting the mixture to a slow aeration until full development of the bacteria in a condition capable of being active in inducing such oxidation during strong aeration of the mixture, and then greatly increasing the amount of aeration, to increase the rate of oxidation, such increase in the amount of aeration being effected when a part only of the organic substance has been oxidized.

15. The process of claim 14 followed by the steps of separating the liquid and the bacteria from each other, combining the bacteria with another bulk of the solution, and subjecting the mixture to strong aeration in the first instance.

In testimony whereof we affix our signatures.
ALBERT JAN KLUYVER.
FRANCISCUS VISSER 'T HOOFT.